(12) United States Patent
Challapalli et al.

(10) Patent No.: US 7,784,025 B2
(45) Date of Patent: Aug. 24, 2010

(54) MECHANISM FOR USING PROCESSLETS TO MODEL SERVICE PROCESSES

(75) Inventors: Jogeswar Challapalli, Austin, TX (US); Hari Haranath Madduri, Austin, TX (US); Ranjit K. Nayak, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1350 days.

(21) Appl. No.: 11/250,023

(22) Filed: Oct. 13, 2005

(65) Prior Publication Data

US 2007/0088598 A1    Apr. 19, 2007

(51) Int. Cl.
G06F 9/44 (2006.01)
(52) U.S. Cl. ...................... 717/106; 717/104
(58) Field of Classification Search ............ None
See application file for complete search history.

(56) References Cited

U.S. PATENT DOCUMENTS

| 5,195,178 | A * | 3/1993 | Krieger et al. ............ 715/809 |
| 6,339,838 | B1 * | 1/2002 | Weinman, Jr. ............ 717/104 |
| 2002/0133802 | A1 * | 9/2002 | Spradlin et al. ........... 717/104 |
| 2002/0156568 | A1 * | 10/2002 | Knott et al. ............... 701/114 |
| 2003/0140126 | A1 * | 7/2003 | Budhiraja et al. ......... 709/220 |
| 2006/0143611 | A1 * | 6/2006 | Sadiq ....................... 718/100 |

FOREIGN PATENT DOCUMENTS

| CN | 1302028 A | 7/2001 |
| CN | 1405680 A | 3/2003 |

OTHER PUBLICATIONS

Visual Paradigm, "Chapter 6 Visual Modeling", Dec. 18, 2003, http://web.archive.org/web/20031210152015/www.visual-paradigm.com/vpumlUserGuide.php.*

* cited by examiner

*Primary Examiner*—Wei Y Zhen
*Assistant Examiner*—Lanny Ung
(74) *Attorney, Agent, or Firm*—Yee & Associates, P.C.; Jeffrey S. LaBaw (57) ABSTRACT

A computer implemented method, data processing system, and computer usable code are provided for using read-only process components to model service processes. User input is received indicating an attempt to establish a connection from a selected read-only process component to a previously selected read-only process component. Responsive to receiving the user input, verification is performed as to whether the connection is a valid connection. In response to all connections being valid, a service model is built using the set of read-only process components and executable code is generated for the service process based on the service model.

20 Claims, 5 Drawing Sheets

MECHANISM FOR USING PROCESSLETS TO MODEL SERVICE PROCESSES

BACKGROUND OF THE INVENTION

1. Field of the Invention

The present invention relates generally to service processes. More particularly, the present invention relates to the use of processlets to model service processes.

2. Description of the Related Art

Business analysts, as well as line-of-business managers, are often responsible for designing and developing new business process models, or adapting existing models, to improve how their companies do business. With process models in place, a well-defined interface is established to identify and transform business processes into service-oriented applications.

Business process modeling tools enable business analysts to model, simulate, and analyze complex business processes quickly and effectively. The term "business process" does not necessarily imply that a business practice is performed. A "business process" is a service proves that provides some service for a requesting application, a user or a customer. For example, a business process may perform machine translation, digital certificate authentication, alphabetic or numeric sorting, or any other useful function.

Business process modeling tools:

Provide comprehensive, user-friendly business process modeling and collaboration tools to graphically model processes across people, partners, and applications.

Allow companies to quickly redesign processes as business needs change.

Support multiple modeling methodologies and industry standards.

Simulate and validate modeled processes and provides key performance metrics.

Provide a team environment to share and maintain versions of models.

Many business processes can be very complex and modeling of the business processes is often restricted by the tools that allow the modeling of these processes. Some current visual tools, such as IBM Rational ROSE, WBI Modeler, and Microsoft Visio, go beyond the basic flowchart for a computer program and allow the modeling of processes. Several companies are agreeing on the use of business process execution language (BPEL) as the standard meta-language for modeling business processes. The use of the business process execution language results in executable code being generated.

Processlets are processes components that are used in modeling service process flows. A processlet is to a process as an applet is to an application or a servlet is to a server. A processlet is a process segment that has semi-independent existence. That is, a processlet has well-defined entry and exit points and the processlet's entry point may be exposed using a Web service interface and, the processlet shares these characteristics with the whole process. A process is made up of several processlets. A process accomplishes a business task and it can be instantiated concurrently to run several business tasks. Processlets are not instantiated outside of the process. Also, several other things like status reporting, versioning, and identification with a business task are all done at the process level and not at a processlet level.

However, no library of business processes and business process flows exist as such a library would require the software solution provider to expose the entire business process implementation. In order to provide such a solution, providers currently ship only one executable file or a set of executable files that work only within a given runtime or the providers ship a Software Development Kit (SDK) which provides more details on building solutions.

A drawback to such solutions, are that customization is not easy and can be very brittle, a small change may call for the entire project to be rebuilt, and output for a solution may be an extensive executable or a set of related executable files.

SUMMARY OF THE INVENTION

The different aspects of the present invention provide a computer implemented method, data processing system, and computer usable code for using read-only process components to model service processes. A user input is received in an attempt to establish a connection from a selected read-only process component to a previously selected read-only process component. In response to receiving the user input, verification is performed as to whether the connection is a valid connection. A service model is built using the set of read-only process components in response to all connections being valid. Executable code is generated for the service process based on the service model.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides for the use of processlets to model service processes. Processlets are processes components that are used in modeling service process flows. A processlet is to a process as an applet is to an application or a servlet is to a server. A processlet is a process segment that has semi-independent existence. That is, a processlet has well-defined entry and exit points and the processlet's entry point may be exposed using a Web service interface and, the processlet shares these characteristics with the whole process. A process is made up of several processlets. A process accomplishes a business task and it can be instantiated concurrently to run several business tasks. Processlets are not instantiated outside of the process. Also, several other things like status reporting, versioning, and identification with a business task are all done at the process level and not at a processlet level.

Figure 1:
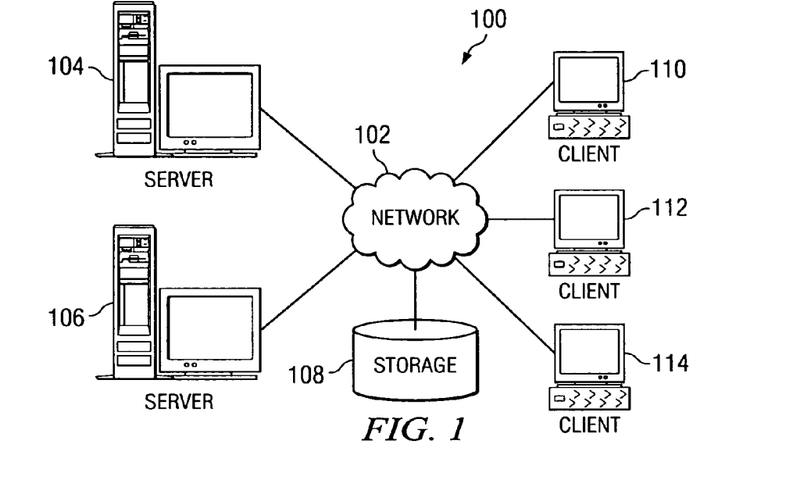
FIG. 1 depicts a pictorial representation of a network of data processing systems in which aspects of the present invention may be implemented.
Figure 2:
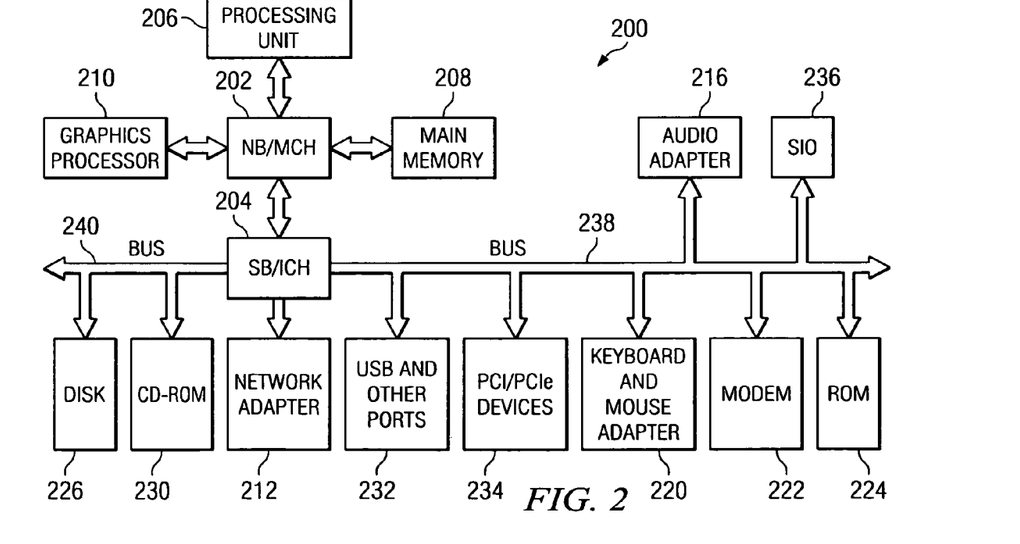
FIG. 2 is a block diagram of a data processing system is shown in which aspects of the present invention may be implemented.

In the many aspects of the present invention, customers are provided with processlets, however, the detailed steps within the processlet is hidden from the customer to protect intellectual property. Customers may only mix and match processlets to form their processes, and not the individual steps within a processlet. Thus, a processlet is a read-only process component of a process. FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read-only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read-only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read-only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The different aspects of the present invention provide for using processlets or read-only process components to model business processes. The term "business process" does not necessarily imply that a business practice is performed. A "business process" is a service proves that provides some service for a requesting application, a user or a customer. For example, a business process may perform machine translation, digital certificate authentication, alphabetic or numeric sorting, or any other useful function. User input is received in an attempt to establish a connection from a selected read-only process component to a previously selected read-only process component. In response to receiving the user input, verification is performed as to whether the connection is a valid connection. In response to all connections being valid, a business model is then built using the set of read-only process components and executable code is generated for the business process based on the business model.

Figure 3:
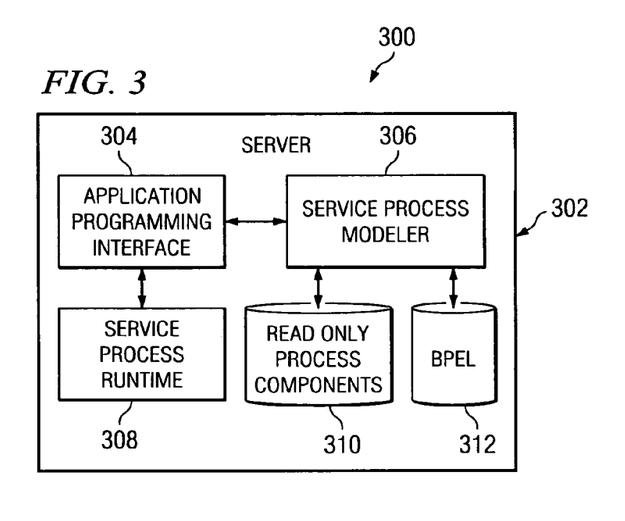
FIG. 3 depicts a functional block diagram the components used to implement the use of read-only process components in accordance with an illustrative embodiment of the present invention.

FIG. 3 depicts a functional block diagram the components used to implement the use of read-only process components in accordance with an illustrative embodiment of the present invention. In exemplary functional block diagram 300, server 302 is a server such as server 104 or 106 of FIG. 1. Server 302 contains application programming interface 304, service process modeler 306, and service process runtime 308 in addition to other components not shown. Read-only process components 310, which are processes components that are used in modeling service process flows, are used by service process modeler 306 in conjunction with business process execution language (BPEL) 312 to model service processes and service process flows and then generate executable code. Each process components in BPEL is a Web service. If a process component in BPEL does not have an associated BPEL template then the process component is considered a read-only process component. The method used to package a process component identifies whether the process component is read-only or not. BPEL does not directly identify a read-only process component. Although business process execution language is used in this example, any modeling language may be configured or used for this purpose. The service process modeled using service process modeler 306 is presented to a user using application programming interface 304. Read-only process components 310 may be presented to the user in any manner such as a menu or set of submenus.

Read-only process components 310 are process components that, when properly ordered, are wired together using a late-binding approach. Read-only process components 310 may be supplied without the source code, thus, the intellectual property may be preserved by the builder. A late-binding approach postpones the use of timing assumptions until the last steps of an application's design. Component-based approaches, such as the late-binding approach, may be used to develop software on top of middleware. Therefore, components may be created whose properties may be proved independently of the timing properties of the environment in which they will be plugged. Timeliness requirements have to be considered as late as possible during timing and scheduling analysis.

Read-only process components 310 may be in the form of any type of programming language, such as Web services description language (WSDL) or business process execution language (BPEL). As an exemplary aspect of the present invention, read-only process components 310 are in the form of Web services description language files, which are read-only process components, and process execution language files, which may be modified by a user. Read-only process components 310 also have associated properties and descriptions defining the service description of each read-only process component. The properties and descriptions of read-only process components 310 are provided to the user through application programming interface 304. The properties of read-only process components 310 also define how the read-only process component is wired and how it may be wired to other read-only process components. The properties associated with read-only process components 310 are the basis for wiring read-only process components 310 together and for errors that may be generated in attempting to tie read-only process components to each other.

Figure 4:
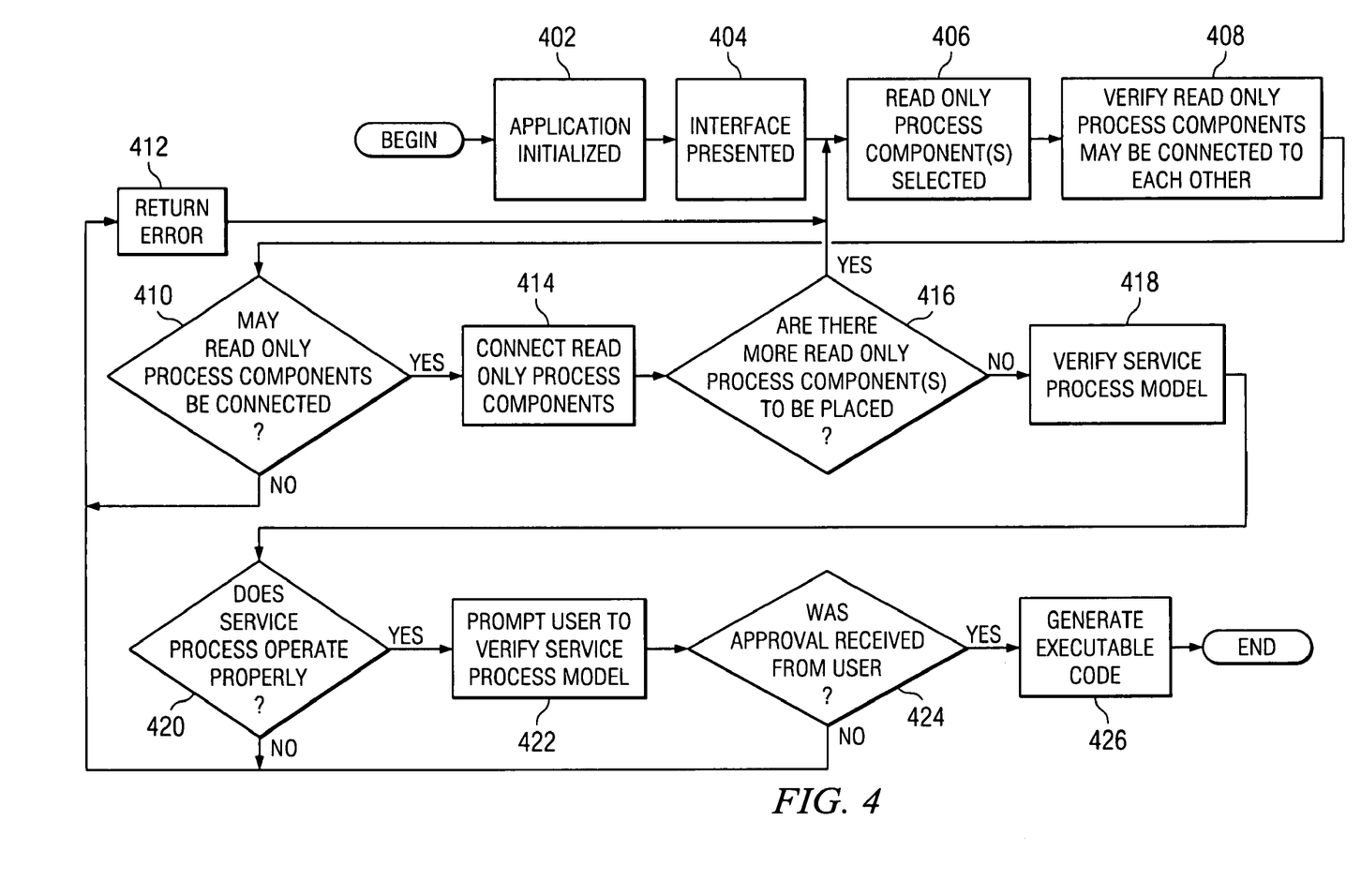
FIG. 4 is a flowchart of an exemplary business process modeling in accordance with an illustrative embodiment of the present invention.

FIG. 4 is a flowchart of an exemplary service process modeling in accordance with an illustrative embodiment of the present invention. The service process modeling may be performed in any modeling application, such as modeler 306 of FIG. 3. As the operation begins, a modeler application is initialized (step 402). The modeler is presented to the user using a graphical user interface, within service process modeler 306 of FIG. 3 (step 404). As the modeler is presented, the user is also presented with a menu of different read-only process components that the user is able to use in modeling a service process. The user is able to select one or more of the read-only process components and place the selected read-only process component in a modeling area (step 406). The modeling area may be any type of area within the graphical user interface, such as a drawing area or whiteboard area. The user may use any type of selection process, such as drag-and-drop or a combination of mouse click and arrow keys.

As each read-only process component is selected and placed in the user's desired order, a connection is made between the previously placed read-only process component and the currently selected read-only process component. As the connection is attempted, verification is made as to whether the attempted connection is a proper connection (step 408). Verification of the connection is performed on the definitions within the properties of the read-only process components. The definitions may be input/output message types in an extensible markup language (XML) schema definition (XSD) and/or Web services description language (WSDL) port types. This type of verification ensures whether two components may be plugged together or not. Verification may be in the form of presenting the user with a visual or audible indication the connection is proper or incorrect. Exemplary visual indications may be a connection line changing colors or a text box popping up and exemplary audible indications may be "beep" or "ding", although any type of indication may be provided. If the read-only process component is not possible of being connected to the previously placed read-only process component (step 410), then an error is returned to the user (step 412). The error may be presented to the user in the form of any type of text presentation, such as a pop-up text box or a pop-up balloon text.

If the read-only process component is capable of being connected to the previously placed read-only process component (step 410), then the read-only process component is connected to the previously placed read-only process component (step 414). A determination is then made as to whether more read-only process components are to be placed (step 416). As an example, this determination may be through the use of a pop-up text block that prompts the user if the service modeling has been completed or through the user selecting another read-only process component. If another read-only process component is to be placed (step 416), the operation returns to step 406. If no other read-only process component is to be placed (step 416), the operation proceeds to verify the newly created service process model (step 418).

In verifying the newly created service process model, the service process modeler uses standard service practices to ensure that the newly created service process model as modeled will operate. The standard service practices are using the Web services standards. The newly created service process model is compared against the standard services practices by comparing each service component operation. However, verification of a service process model only validates the service process model will operate; it does not ensure that the service process model operates as the user intends. If the newly created service process model operates incorrectly based on the standard service practices (step 420), then an error is returned to the user (step 412). If the newly created service process model operates correctly based on the standard service practices (step 420), then the user is prompted to verify the newly created service process model operates as the user intends (step 422).

If the user does not approve the newly created service process model (step 424), then an error is returned to the user (step 412). If the user approves the newly created service process model (step 424), then executable code is generated based on the newly created service process model (step 426), with the operation ending thereafter.

Figure 5:
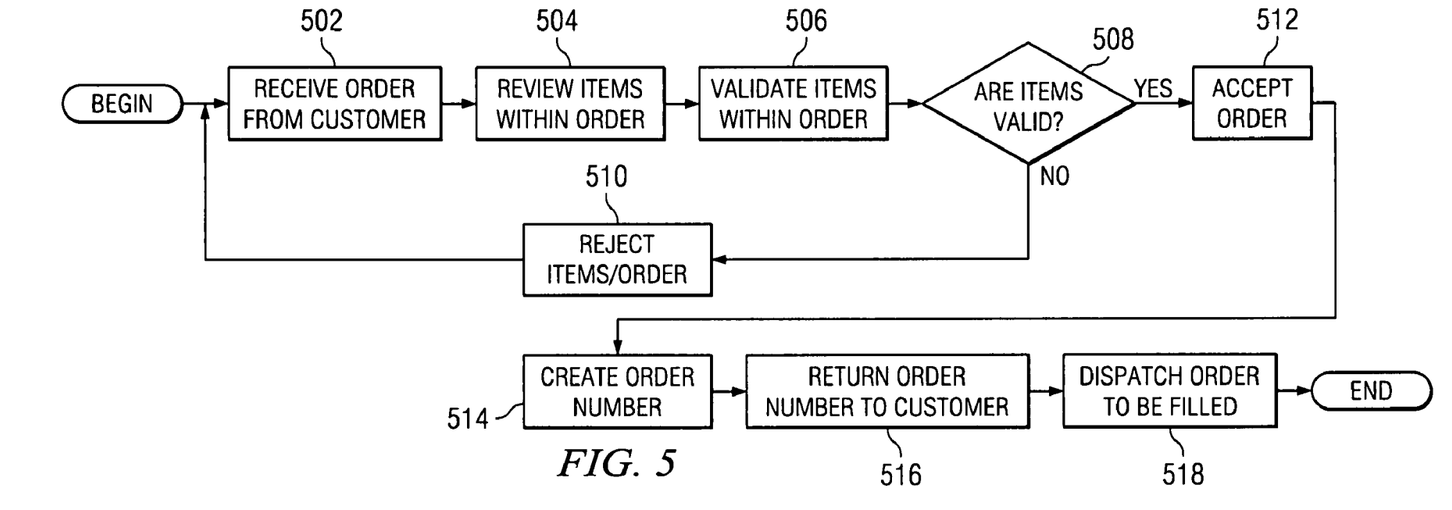
FIG. 5 is an exemplary business process model flow diagram in accordance with an illustrative embodiment of the present invention.

In order to exemplify a business process, FIG. 5 is an exemplary business process model flow diagram in accordance with an illustrative embodiment of the present invention. As the business process begins, an order is received from the customer (step 502). The items of the order are reviewed (step 504) and each item within the order is validated for correctness (step 506). If any item within the order is not valid (step 508), an error is returned to the customer (step 510). If all the items within the order are valid (step 508), then the order is accepted (step 512).

An order number is created and associated with the customer's order (step 514). The order number is returned to the customer, which acknowledged that the order has been accepted (step 516). Finally, the order is dispatched to be filled (step 518), with the operation ending thereafter. The business process flow described in FIG. 5 is an exemplary business process flow and is not intended to be limiting of the numerous business processes that currently exist or will exist in the future. The inventive aspects of the present invention will allow any read-only process component to be integrated into a business process modeler.

Figure 6:
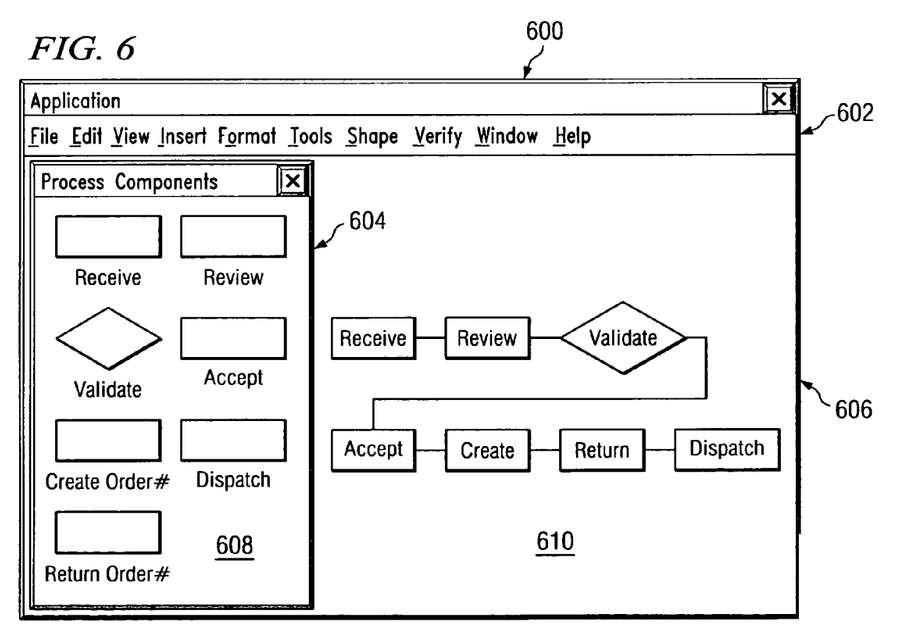
FIG. 6 is an exemplary graphical user interface (GUI) for a business process modeler in accordance with an illustrative embodiment of the present invention.

FIG. 6 is an exemplary graphical user interface (GUI) for a business process modeler in accordance with an illustrative embodiment of the present invention. Window 600 is an example of a graphical user interface that may be implemented in business process modeler 306 of FIG. 3. Window 600 consists of a tool bar 602, menu area 604, and modeling area 606. Tool bar 602 provides a user with the tools that are available to operate window 600. Some exemplary items shown to be part of tool bar 602 are "File", "Edit", "View", "Insert", "Format", "Tools", "Shape", "Verify", "Window", and "Help". Although the present invention only depicts these tools, one of ordinary skill in the art would realize other features may be provided.

Menu area 604 shows that read-only process components 608 that are available for modeling by the user. Exemplary read-only process components 608 of menu area 604 are shown as "Receive", "Review", "Validate", "Accept", "Create Order #", "Dispatch", and "Return Order #", although any read-only process component may be provided in menu area 604. Modeling area 606 may be any type of area within the graphical user interface, such as a drawing area or whiteboard area. Modeling area 606 is the area where the user is able to place read-only process components selected by the user from menu area 604. Modeling area 606 depicts business process model 610 that is an exemplary model created using read-only process components 608 from menu area 604. Business process model 610 depicts a simple business process flow where the various read-only process components are connected in a direct flow.

Figure 7:
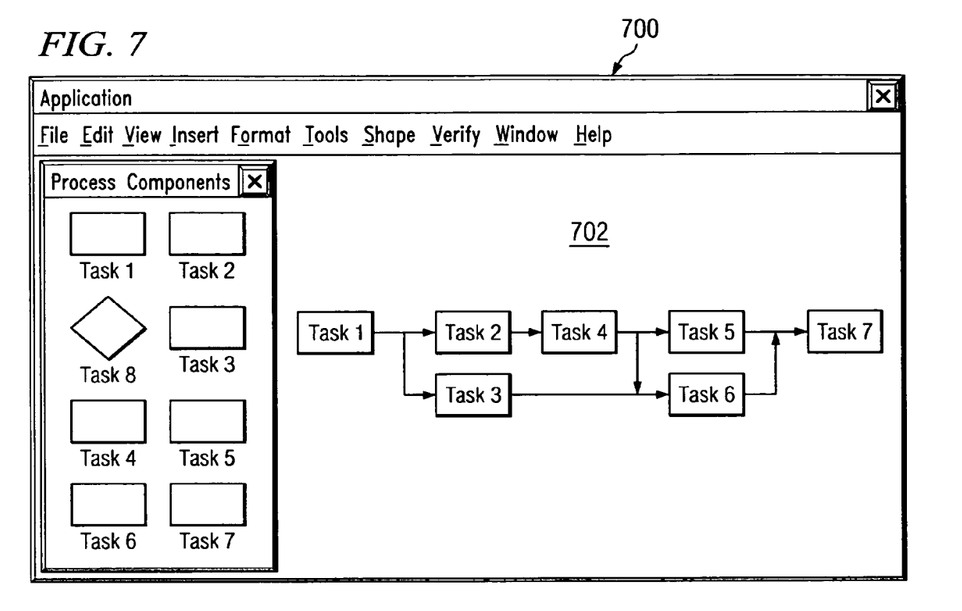
FIG. 7 is an exemplary graphical user interface (GUI) depicting a complex business process model in accordance with an illustrative embodiment of the present invention.

FIG. 7 is an exemplary graphical user interface (GUI) depicting a complex business process model in accordance with an illustrative embodiment of the present invention. Window 700 is an example of a graphical user interface that may be implemented in business process modeler 306 of FIG. 3. Exemplary business process model 702 depicts a complex business process flow where various read-only process components representing different tasks are connected to perform a specific business operation. Business process model 702 indicates that different read-only process components may be connected to any other read-only process component to obtain a specific behavior of a business proves as long as the input and the outputs of the read-only process components match.

Figure 8:
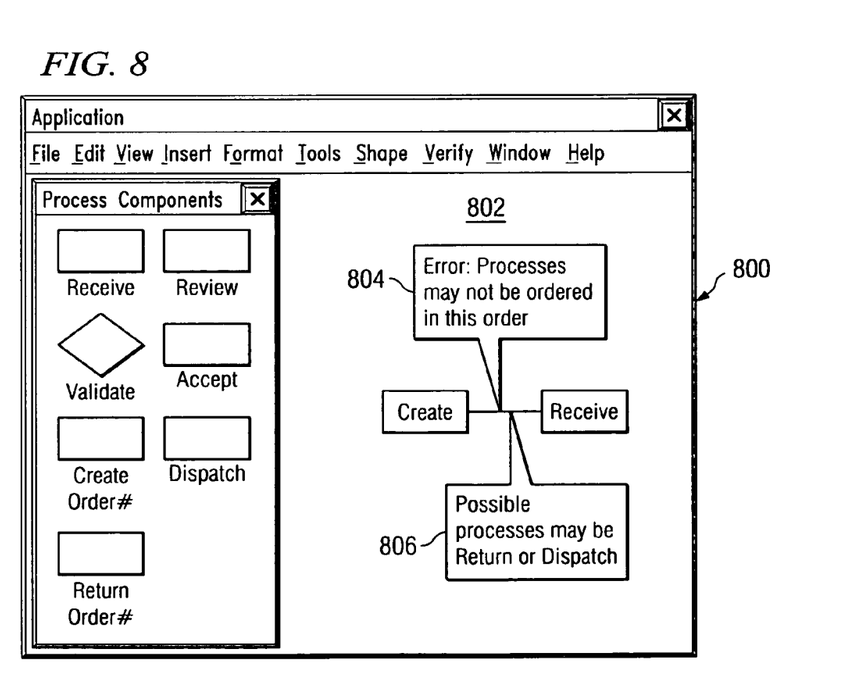
FIG. 8 is an exemplary graphical user interface (GUI) depicting additional information available in a business process modeler in accordance with an illustrative embodiment of the present invention.

FIG. 8 is an exemplary graphical user interface (GUI) depicting additional information available in a business process modeler in accordance with an illustrative embodiment of the present invention. Window 800 is an example of a graphical user interface that may be implemented in business process modeler 306 of FIG. 3. In exemplary window 800, model 802 is being modeled. As illustrated a user is attempting to place a read-only process component of "Receive" after a previously placed read-only process component of "Create". As an inventive aspect of the present invention, in attempting to place the read-only process component "Receive", error message 804 is presented to the user stating "Error: Process may not be ordered in this order". Error message 804 is an exemplary error and any type of error message may be presented to the user.

As an additional inventive aspect of the present invention, supplemental message 806 is also presented to user. Supplemental message 806 is a help message in which a suggestion is made to the user of possible read-only process components that may be placed after read-only process component "Create". Supplemental message 806 is an exemplary message and any type of message may be presented to the user. Supplemental message 806 is a message presented to the user based upon standard business practices to ensure that the newly created business process model as modeled will operate.

Thus, the different aspects of the present invention provide a computer implemented method, data processing system, and computer usable code for using read-only process components to model service processes. User input is received in an attempt to establish a connection from a selected read-only process component to a previously selected read-only process component. In response to receiving the user input, verification is performed as to whether the connection is a valid connection. A service model is built using the set of read-only process components in response to all connections being valid and, executable code is generated for the service process based on the service model.

The invention can take the form of an entirely hardware embodiment, an entirely software embodiment or an embodiment containing both hardware and software elements. In an illustrative embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be (1) a computer-readable medium including an electronic, magnetic, optical, electromagnetic, infrared, or semiconductor system (or apparatus or device) or (2) a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read-only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for using read-only process components to model a service process, the computer implemented method comprising:
    receiving user input to establish a connection from a selected read-only process component to a previously selected read-only process component in a set of read-only process components;
    responsive to receiving the user input, verifying whether the connection is valid;
    building a service model using the set of read-only process components if all connections are valid, wherein the set of read-only process components are used in conjunction with a business process execution language comprising process components, wherein the set of read-only process components are certain ones of the business process execution language process components that do not have an associated business process execution language template associated therewith; and
    generating executable code for the service process based on the service model.

2. The computer implemented method of claim 1, wherein the building step is initiated in response to a subsequent user input indicating that all read-only process components have been placed for the service process.

3. The computer implemented method of claim 1, wherein the verification of a valid connection is based on the properties of the selected read-only process component, and wherein at least some of the process components in the business process execution language are Web services.

4. The computer implemented method of claim 1, wherein the selected read-only process component is selected from the set of read-only process components and wherein the set of read-only process components are presented in a read-only process components menu.

5. The computer implemented method of claim 4, wherein the selection of the selected read-only process component from the read-only process components menu includes:
    providing a selection tool; and
    providing submenus of the set of read-only process components.

6. The computer implemented method of claim 1, wherein the building of the service model using the set of read-only process components includes:
    responsive to verification that the connection is valid, connecting the selected read-only process component to the previously selected read-only process component; and
    providing an indication of the connection.

7. The computer implemented method of claim 6, wherein the indication of the connection is at least one of an audible signal or a visual signal.

8. The computer implemented method of claim 1, further comprising:
    responsive to an invalid connection, sending an error message to the user.

9. The computer implemented method of claim 1, further comprising:
    responsive to an invalid connection, providing a list of read-only process components from the set of read-only process components that can be connected properly to the previously selected read-only process component.

10. The computer implemented method of claim 1, wherein building the service model using the set of read-only process components includes:
    presenting the service model in a graphical user interface.

11. The computer implemented method of claim 1, further comprising:
verifying the service model operates properly.

12. The computer implemented method of claim 11, wherein verifying the operation of the service model is performed by comparing the service model to service process standards.

13. The computer implemented method of claim 11, wherein verifying the operation of the service model is performed by prompting a user to verify the service model.

14. A computer program product comprising:
a computer readable medium including computer usable program code recorded thereon for using read-only process components to model a service process, wherein the set of read-only process components are used in conjunction with a business process execution language comprising process components, wherein the set of read-only process components are certain ones of the business process execution language process components that do not have an associated business process execution language template associated therewith, the computer program product including:
computer usable program code for receiving user input to establish a connection from a selected read-only process component to a previously selected read-only process component in a set of read-only process components;
computer usable program code for verifying whether the connection is valid in response to receiving the user input;
computer usable program code for building a service model using the set of read-only process components if all connections are valid; and
computer usable program code for generating executable code for the service process based on the service model.

15. The computer program product of claim 14, wherein the selected read-only process component is selected from the set of read-only process components, wherein the set of read-only process components are presented in a read-only process components menu, wherein at least some of the process components in the business process execution language are Web services, and wherein the selection of the selected read-only process component from the read-only process components menu includes:
computer usable program code for providing a selection tool; and
computer usable program code for providing submenus of the set of read-only process components.

16. The computer program product of claim 14, wherein the computer usable program code for building the service model using the set of read-only process components includes:
computer usable program code for connecting the selected read-only process component to the previously selected read-only process component in response to verification that the connection is valid; and
computer usable program code for providing an indication of the connection.

17. The computer program product of claim 14, further comprising:
computer usable program code for verifying the service model operates properly.

18. A data processing system comprising:
a bus system;
a communications system connected to the bus system;
a memory connected to the bus system, wherein the memory includes a set of instructions; and
a processing unit connected to the bus system, wherein the processing unit executes the set of instructions to receive user input to establish a connection from a selected read-only process component to a previously selected read-only process component in a set of read-only process components, wherein the set of read-only process components are used in conjunction with a business process execution language comprising process components, wherein the set of read-only process components are certain ones of the business process execution language process components that do not have an associated business process execution language template associated therewith; verify whether the connection is valid in response to receiving the user input; build a service model using the set of read-only process components if all connections are valid; and generate executable code for the service process based on the service model.

19. The data processing system of claim 18, wherein the selected read-only process component is selected from the set of read-only process components, wherein the set of read-only process components are presented in a read-only process components menu, wherein at least some of the process components in the business process execution language are Web services, wherein the selection of the selected read-only process component from the read-only process components menu includes the processing unit executing the set of instructions to provide a selection tool; and provide submenus of the set of read-only process components.

20. The data processing system of claim 18, wherein building the service model using the set of read-only process components includes the processing unit executing the set of instructions to connect the selected read-only process component to the previously selected read-only process component in response to verification that the connection is valid; and provide an indication of the connection.

* * * * *